(12) United States Patent
Michl et al.

(10) Patent No.: US 9,532,246 B2
(45) Date of Patent: Dec. 27, 2016

(54) METHOD AND A TEST SYSTEM FOR AUTOMATICALLY CONFIGURING A TESTER

(71) Applicant: Rohde & Schwarz GmbH & Co. KG, Munich (DE)

(72) Inventors: Andreas Michl, Munich (DE); William Powell, Munich (DE)

(73) Assignee: Rohde & Schwarz GmbH & Co. KG, Munich ( * ) Notice: Subject to any disclaimer, the term of this patent is extended or adjusted under 35 U.S.C. 154(b) by 0 days.

(21) Appl. No.: 14/433,515

(22) PCT Filed: Oct. 4, 2012

(86) PCT No.: PCT/EP2012/069574
§ 371 (c)(1),
(2) Date: Apr. 3, 2015

(87) PCT Pub. No.: WO2014/053177
PCT Pub. Date: Apr. 10, 2014

(65) Prior Publication Data
US 2015/0264590 A1 Sep. 17, 2015

(51) Int. Cl.
*H04B 17/00* (2015.01)
*H04W 24/06* (2009.01)
*H04B 17/11* (2015.01)
*H04W 24/02* (2009.01)

(52) U.S. Cl.
CPC ......... *H04W 24/06* (2013.01); *H04B 17/0085* (2013.01); *H04B 17/11* (2015.01); *H04W 24/02* (2013.01)

(58) Field of Classification Search
CPC . H04B 17/0085; H04B 17/364; H04B 17/391; H04B 17/3911; H04B 17/3912; H04B 17/3913
See application file for complete search history.

(56) References Cited

U.S. PATENT DOCUMENTS

| 2005/0108288 | A1* | 5/2005 | Hartshorne | ............... G06F 8/65 |
| 2006/0128373 | A1* | 6/2006 | Cochrane | ................ H04M 1/24 455/424 |
| 2007/0072599 | A1 | 3/2007 | Romine et al. | |
| 2007/0287445 | A1 | 12/2007 | Logan | |
| 2011/0053518 | A1* | 3/2011 | Shindo | ............... H04B 17/0085 455/67.14 |

FOREIGN PATENT DOCUMENTS

DE 102009015248 A1 10/2010

* cited by examiner

*Primary Examiner* — Ping Hsieh
(74) *Attorney, Agent, or Firm* — Lee & Hayes, PLLC

(57) ABSTRACT

A method for automatically configuring a tester to perform functionality tests between a mobile station under test and a tester simulating a mobile communication system. The method includes receiving an identification information according to the type of the mobile station under test in the tester, retrieving characteristic parameters of the identified type of the mobile station under test from a device database by the tester, and selecting a subset of test cases which is applicable to the characteristic parameters of the identified mobile station under test from a test case database by the tester and offering the subset of test cases to generate a test program by applying one or more test cases of the selected subset.

21 Claims, 2 Drawing Sheets

METHOD AND A TEST SYSTEM FOR AUTOMATICALLY CONFIGURING A TESTER

TECHNICAL FIELD

The present invention relates to a method and a test system for automatically configuring a tester to perform functionality tests between a mobile station as a mobile device and a tester emulating a mobile telecommunication system as well as to a digital storage medium and a computer program to apply the method.

BACKGROUND

Current mobile stations have to be tested according to the operating functionalities, i.e. radio and connection functions according to OSI model layers 1-3 in the communication system as well as according to the applications, e.g. voice and/or data services or services based on data transmission, according to OSI model layers 5-7 for communication in mobile communication systems. Especially the operating functionality tests have to be performed during the development process of the mobile station and during conformance tests to release the mobile station for use in a public mobile network.

Mobile stations often support a variety of different mobile communication standards operating on different frequency bands and supporting a variety of functionalities associated with the different mobile standards like HSPA, LTE-Advanced. In early development phases a mobile station often does not support all mandatory features e.g. security procedures, to pass all required signaling procedures. Therefore it is necessary to adapt the tester according to the operating parameter and the functionalities of each mobile station to be tested, e.g. frequency band, authentication version, and to configure some procedures with special values to test all other functions exercised in a test case.

On the other hand, a large number of test scenarios and test cases are offered to a test operator, but not all of them are applicable to the connected mobile station, because e.g. the mobile standard, LTE, WCDMA, etc. or their specific embodiments like HSDPA, HSUPA, LTE Rel.9/10, etc. are not supported by the mobile station or because the software version of the mobile station to be tested is not yet complete and does not support all functionalities, e.g. security function.

In DE 10 2009 015 248 A1, a method is described for automatically testing a mobile station with respect to application programs or system programs running on the mobile station. In this method, a processing unit, e.g. a test server, in the communication network receives an identification number of the mobile station under test and information on the required test to be performed on the mobile station by either a test operator or by the mobile station itself, e.g. in reaction to an error occurred during execution of an application. The processing unit selects one or more stored test programs and optionally adapts it or them to specific parameters provided in the received information on the required test program. The type of mobile station is recognized by the identification number of the mobile station, here its MSISDN number. A test specification applicable to the type of mobile station has already been stored in the test server. The processing unit sends the test program e.g. by using a short message service (SMS) to the mobile station under test, where the test program is executed. The mobile station sends back test results to the processing unit for evaluation.

This test method only selects or adapts a test program to test an application or system programs running on the specific type of, i.e. functionality of OSI layers 5-7. To test operating functionalities of OSI layers 1-3, i.e. radio transmission or connection or mobility management functions, which require the exchange of signaling messages between the mobile station and the mobile communication system, a tester is required to emulate the network part of mobile communication system. This tester has to be configured in terms of the frequency band, the modulation, software and hardware version, etc. used or implemented in the actual mobile station to be tested. Also, only a subset of test cases can be successfully performed dependent on the already implemented functionalities in the mobile station.

Therefore it is the object of the present application to provide a method and test system that supports the test operator to select suitable test cases of a tester and to configure the tester according to the capabilities of the actual mobile station under test.

SUMMARY

The object is solved by the inventive method according to the instant application.

The method of automatically configuring a tester to perform functionality tests between a mobile station as mobile station under test and a tester emulating a mobile communication system comprises as a first step that the tester is receiving identification information according to the type of the mobile station under test in the tester. The tester is retrieving characteristic parameters of the identified type of mobile station under test from a device database. Subsequently the tester is selecting a subset of test cases applicable to the characteristic parameters of the identified mobile station under test from a test case database and is offering the subset of test cases to generate a test program by applying one or more test cases of the selected subset.

Optionally the operating parameters of the tester are automatically configured to enable the execution of the test program with the characteristic parameters of the identified mobile station under test.

This significantly reduces the time to configure the tester by reducing the number of unsuccessful tests by errors in a tester configuration for the dedicated mobile station under test. Furthermore, the test operator requires less detailed knowledge of the characteristics of the mobile station under test and the tests can be reproduced much more easily.

In a preferable embodiment the method also includes evaluating a created log file of the performed test program and adapting the applied configuration of the tester and/or the selected subset of test cases according to the results of the evaluation. This allows a fast identification of e.g. missing or erroneously set parameters or not available but required hardware or software of the tester and a continuous improvement of the test case database and/or device database.

Preferably, the tester receives an identification information of the mobile station under test and optionally also the characteristic parameters or part of them of the mobile station under test by a connected data storage medium and/or by an image recognition unit and/or by a barcode reader. This allows a very flexible input of the identification information and characteristic parameter of the mobile station under test especially using a barcode reader. Especially data storage media and barcodes can provide a large amount of data and therefore additional information e.g. from the manufacturer regarding software or hardware versions of the mobile station under test and also a international mobile equipment identification (IMEI) assigned uniquely to that mobile station can be provided easily.

Another preferable embodiment is to receive the identification information and/or characteristic parameters by signaling messages sent from the mobile station under test itself to the tester. Information about the mobile station capabilities are included e.g. in the feature group indicator information field sent during connection setup from the mobile station to the mobile communication system. This is especially of interest if the device database does not yet include a data set for the respective type of mobile station or to update an already existing data set.

It is further a preferable embodiment of the method to establish a mobile station under test data set in the device database including the characteristic parameters of the mobile station under test, especially information on operating parameters, functional capabilities and/or software and/or hardware versions of the mobile station under test. This step has the advantage to collect a variety of characteristic parameters for each type of mobile station under test at one central unit and to access and correlate this data with the test cases and/or tester configuration. Information about a new type of mobile station under test can be easily added by establishing a new data set. Additional information can be added to an already existing device data set.

It is further preferable to store a parameter set provided by the technical standard, for example 3GPP TS 36.523, to a mobile station under test data set. A specific parameter set is standardized for a number of mobile station classes which have to be applied to specified test programs for the according mobile station class. Usually test cases have to be adapted to the standardized parameter depending on the type of mobile station under test. This can now be done automatically by correlating the mobile station under test data set with the applicable test cases.

Furthermore, a preferable method step is storing a test result of a mobile station under test correlated to its identification information. This allows a reliable correlation and tracking of test result to a mobile station under test. By this it is also possible to do a statistical evaluation of the test cases performed for a specific type of mobile station.

A preferable embodiment of the inventive method is to store settings and/or tester configurations applied by a specific test operator in an operator data set. This facilitates configuration of the tester when used by different operators, who often prefer different tester settings and also test programs preferred by specific test operator.

Furthermore, it is preferable to compare the available software and/or hardware components and/or version of the test system to a software and/or hardware required to perform the test program and to detect and report missing software and/or hardware components.

The inventive test system for automatically configuring a tester to perform functionality tests between a mobile station and a tester comprises a tester emulating a mobile communication system and interacting with a mobile station under test, an input unit, a mobile station database storing characteristic parameters of the mobile station under test, a test case database storing test cases applicable to the characteristic parameters of the various different types of mobile station under test and storing operating parameters of the tester for all available test cases. Furthermore, in the DUT data set additional information like interconnections of MIMO mobile stations or from the operator himself edited comments can be provided. The tester is constructed to receive identification information of the mobile station under test from the input unit, to retrieve the characteristic parameters of the identified mobile station under test from the device database, to select a subset of test cases and the according operating parameter of the tester applicable to the identified mobile station under test from the test case database and to offer a subset of test cases to an operator to generate a test program by applying one or more test cases of the selected subset and to configure itself according to the operating parameter of the tester required for the selected subset of test cases with the characteristic parameters of the mobile station under test.

These test systems allow an automatic correlation of the identified type of mobile station to a possible subset of test cases and to configure the tester to enable the performance of the test program.

BRIEF DESCRIPTION OF THE DRAWINGS

Embodiments of the inventive method and test system are depicted as an example in the following drawings and will be described according to the following description. Specifically.

The same units are marked with the same reference signs in all figures.

DETAILED DESCRIPTION

Figure 1:
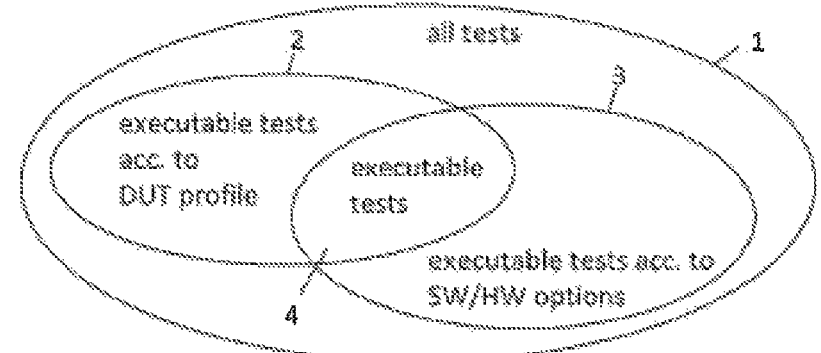
FIG. 1 illustrates a schematic overview on requirements to perform a test.

FIG. 1 shows the problems envisaged when testing a mobile station. Current mobile stations have to be tested according to the operating functionalities, i.e. radio and connection functions according to OSI model layers 1-3 in a mobile communication system. These tests are performed by connecting the mobile station to the tester. The tester provides a large number of tests, but not all of them are applicable to the connected mobile station. From the entirety of tests 1 shown in FIG. 1 only a subset 2 of test can be applied according to the profile of a mobile station with respect to the supported mobile standard like LTE, WCDMA and/or only one or more specific embodiments like HSDPA, HSUPA or releases like LTE Rel.9/10. A further subset 3 of tests is only applicable according to the Hardware and Software version of the mobile station. This delimits the set of executable tests 4 to the intersection of the subset 2 and subset 3 of tests.

Accordingly before performing a test series the mobile station's capabilities have to be determined and the tester has to be configured to perform the subset 4 of executable tests.

Figure 2:
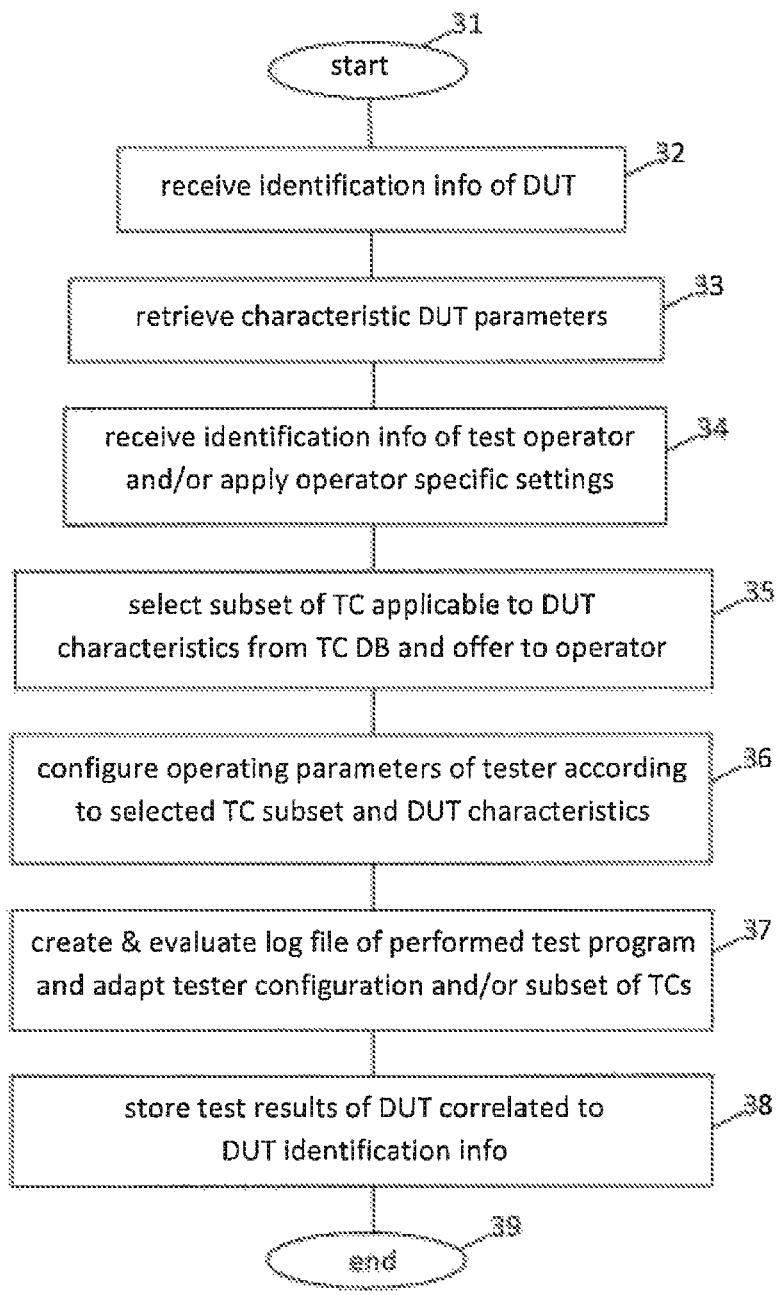
FIG. 2 illustrates an exemplary embodiment of the inventive method as a flow chart.

FIG. 2 shows an embodiment of the inventive method of automatically configuring a tester as a flow chart 30. A corresponding exemplary embodiment of a test system can be seen in FIG. 3 and the corresponding reference signs are used in the description of the method.

When a test is started, see step 31, at first a tester 12 receives identification information of the mobile station 11 which shall be tested. Such a mobile station 11 is also called device under test (DUT) 11. After that the tester retrieves in step 33 characteristic parameters of the mobile station under test 11 from the device database 14.

Optionally, the tester 12 receives identification information about the test operator, who supervises the test procedure, and applies operator specific settings to the tester 12, see step 34. Such operator specific settings can display settings like color or font in an output unit, preferred application windows on display or even preferred or last applied test program used from this operator.

In the next step 35, the tester selects a subset of test cases which is applicable to the mobile station under test especially with respect to the DUTs 11 characteristic parameters from the test case database 15 and offers them to the operator. The operator can further select one or more test case out of the offered subset of test cases to create a test program.

After that the operating parameters of the tester itself are set according to the requirement of the selected test program, i.e. test case subset and the mobile station under test characteristics in step 36.

In a preferred embodiment of the method, a log file of the performed test program is created and evaluated, see step 37. E.g. if an operating parameter of the tester is not set at all or the value of the parameter does not fit to the DUT 11 or selected test case, this is reported in a log file. Also information on the required software and/or hardware options or versions of the test system or DUT 11 to perform a test case successfully are reported in the log file and can be extracted to improve the configuration of the tester. This allows an automatic optimization of selected subset of test cases and of the tester configuration. The subset of the test cases and/or the tester configuration is adapted according to the results of this evaluation. The adaption can be included automatically or has to be enabled by approval or authorization of a superior control entity.

A further preferred embodiment of the method is to store the test results of the DUT 11, see step 38, correlated to the DUTs 11 identification information. This allows to retrace all tests already performed to a specific DUT type or to create statistics about the e.g. reliability of a DUT's functionality or to compare performance of a functionality of different DUT types. With the said step the test ends in step 39.

Figure 3:
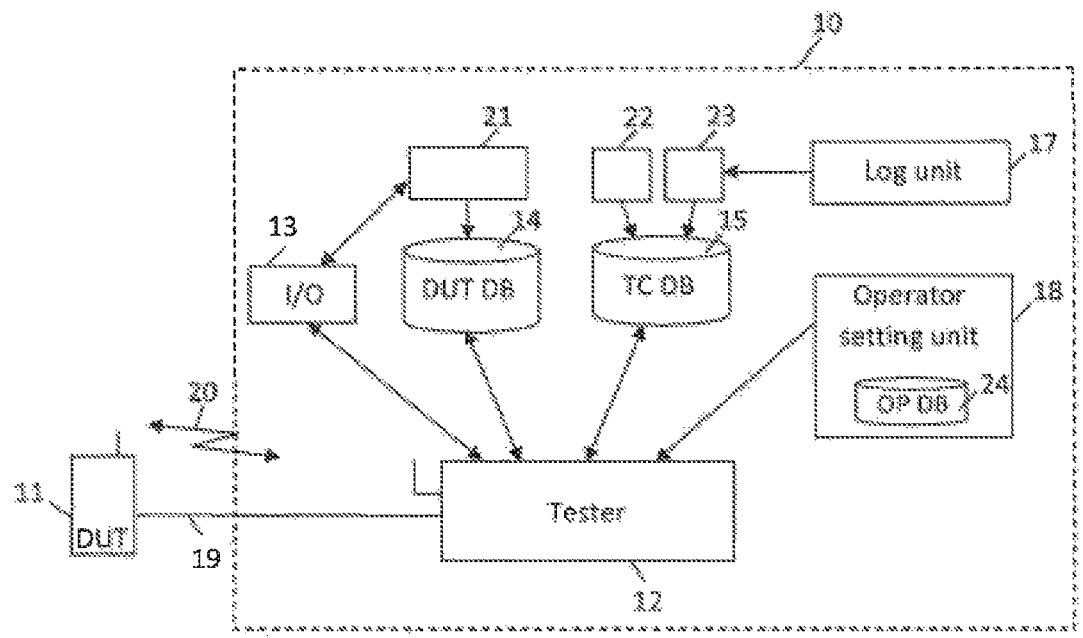
FIG. 3 illustrates an exemplary embodiment of the inventive test system in schematic form as a block diagram.

FIG. 3 shows an embodiment of the inventive test system 10 used to test various functionalities of a mobile station as a mobile station under test 11. Mobile stations often support several different mobile communication standards like HSDPA (High-Speed Downlink Packet Access), HSUPA (High-Speed Uplink Packet Access) and LTE (Long Term Evolution) working on different frequency bands and using different modulation types or using one or several antennas. On the other hand, a test system 10 offers a large number of test cases which are not all applicable to the current mobile station under test. Therefore, only those test cases of functions which are also supported by the device under test 11 are relevant to perform.

Furthermore, the remaining applicable test cases have to be adapted to the characteristic parameters of the actual DUT 11 like frequency band and modulation or used security algorithms. Furthermore, a corresponding software and/or hardware option of the tester has to be activated to test certain DUT functionalities. To facilitate the configuration of the tester 12 in accordance with the current mobile station under test 11, the test system 10 includes a device database 14 in which the characteristic parameters of each type of mobile station under test 11 is stored related to a identification information assigned to the type of mobile station in a device dataset as a DUT profile and so on, according to a DUT capability scheme.

The mobile station under test 11 is connected either by a radio interface 20 and/or via a wired connection 19 to the tester. An input/output unit 13 is connected to the tester 12. The input/output unit 13 comprises a manual input device, e.g. a keyboard, and/or an image recognition unit and/or a barcode reader.

The DUT profile in the device database 14 is established by a DUT configurator 21, which receives information about the DUT characteristic parameters e.g. manually by typing, by reading a barcode or other image recognition method via the input/output unit 13. Therefore the input/output unit 13 comprises e.g. a keyboard, an image recognition unit or a barcode reader. Additionally, a device dataset can store characteristic parameters of the DUT 11, which can be input via signaling messages received from the DUT 11 during e.g. connection set up by the tester 12 in a user equipment capability procedure using the feature group indicator. Further the device database 13 can store characteristic parameters provided by a technical specification, such as for example 3GPP TS 36.523 part 1 or part 2 or part 3, to each dataset, which provide characteristic parameters to be applied in various test cases by a dedicated type of mobile station. Furthermore, additional information like interconnections of antennas in a MIMO mobile station or information from the operator himself or edited comments can be stored in the data set.

The device database 14 is implemented e.g. on an application server, which is remotely accessible by the tester e.g. via an IP network. Alternatively, the device database 14 is implemented on an external storage medium and connected via a local interface to the tester. One preferred option is to connect the external storage medium by a universal serial Bus (USB), e.g. as a USB Dongle, to the tester. As many mobile stations under test 11 already have a USB port, the DUT 11 itself can be used as external storage medium providing the device dataset and connected via this USB interface to the tester 12.

Further, a test case database 15 is also connected to the tester 12. The test case database 15 includes a description for each test case providing dedicated requirements to the DUT 11 and the configuration of the tester 12 to perform the test. For example, the required hardware and/or software options to perform a test case are interrelated to the available test cases. A test configurator 22 enables the establishment and modification of the description for a test case and stores the description into a test case database 15.

The test system 10 further comprises a log unit 17. The log unit 17 is constructed to generate and store error messages or other event messages, e.g. indicating missing test cases to perform certain test programs or an erroneously set frequency or modulation or missing software or hardware options of the tester 12 during the performance of the test. The log files in the log unit 17 are evaluated by a test log analyzer 23 to identify automatically certain requirements of a test case with respect to the tester configuration and the type of mobile station under test 11. Therefore, the log unit 17 is connected to test log analyzer 23 and the test log analyzer 23 is connected to the test case database 15.

An adoption of a test case or test program according to the results of test log can be accepted and submitted automatically in the test case data base 15. Alternatively, such an adoption has to be released and enabled by a superior control entity, like a supervisor, to prevent any unwanted adoption. This ensures that only wanted, useful and hard and software compatible modifications are accepted in the test case database 15.

As a further optional embodiment a test operator setting unit 18 with an operator database 24 is included in the test system 10 and connected to the tester 12. The operator database 24 holds information about the preferred settings used by a test operator. These operator specific settings are applied to the test system 10 and especially to the tester 12 if an operator is identified. The identification of an operator can be achieved via the input/output unit 13 comprising a manual input device or a USB interface, an image recognition unit or a barcode reader. An image recognition system can for example be used in connection with a camera also provided by the input output unit 13.

The identification information of the mobile station under test 11 is received by the tester 12 by manual input device or image recognition unit or barcode reader by the input/output unit 13. A further option in this embodiment is that identification information of the DUT 11 is received by a signaling message sent from the DUT during connection setup via radio interface 20 with one or several antennas or via a wired connection 19.

After the identification information is received, the tester 12 retrieves the characteristic parameters of the DUT 11 from device database 14 and selects a subset of test cases applicable to these characteristic parameters from the test case database 15 including the operating parameter of the tester 12 to perform these test cases. These subset of test cases is offered to the test operator e.g. via the input/output unit 13 to generate a test program by applying one or concatenate more test cases of the subset. The tester 12 configures itself according to the applied test program.

The measurement results and/or log files are stored correlated with the DUT's 11 identification information. This enables to perform statistics of a certain type of mobile station in order to trace the already performed test programs of a mobile station 11. In case of a lost DUT 11 it can be determined at which test system 10 the DUT was tested the last time.

The invention is not limited to the described example. The invention also comprises all combinations of any of the described or depicted features.

The invention claimed is:

1. A method of automatically configuring a tester to perform functionality tests between a mobile station under test and the tester simulating a mobile communication system, the method comprising:
 receiving identification information of a type of the mobile station under test in the tester;
 retrieving characteristic parameters of the mobile station under test from a device database by the tester;
 selecting a subset of test cases which is applicable to the characteristic parameters of the type of the mobile station under test from a test case database by the tester;
 offering the subset of test cases to generate a test program by applying one or more test cases of the selected subset;
 evaluating a created log file of a performed test program;
 adapting an applied configuration of the tester and/or the selected subset of test cases according to results of the evaluation of the created log file; and
 comparing the available software and/or hardware components and/or version of a tester to a software and/or hardware required to perform the test program and to detect and report missing software and/or hardware components.

2. The method according to claim 1, further comprising configuring at least one operating parameter of the tester in accordance with the test cases of the test program and the characteristic parameters of the type of the mobile station under test.

3. The method according to claim 1, wherein the adapting of the applied configuration of the tester and/or the selected subset of test cases is to be enabled.

4. The method according to claim 1, wherein the adapting of the applied configuration of the tester and/or the selected subset of test cases are approved and enabled via a superior control entity.

5. The method according to claim 1, wherein the receiving the identification information of the type of the mobile station under test occurs via at least one of a connected data storage medium, an image recognition unit, or a barcode reader of the tester.

6. The method according to claim 1, wherein the receiving the identification information of the type of the mobile station under test occurs via signaling messages sent from the mobile station under test.

7. The method according to claim 1, further comprising establishing a mobile station under test dataset in the device database including the characteristic parameters of the type of the mobile station under test, the characteristic parameters including information of the type of the mobile station under test on at least one of: operating parameters, functional capabilities, or versions of software and/or hardware.

8. The method according to claim 1, further comprising establishing a mobile station under test dataset including a parameter set provided by a technical standard 3GPP TS 36.523 to be applied to the test program.

9. The method according to claim 8, further comprising:
 receiving the characteristic parameters of the mobile station under test by at least one of a data storage medium, an image recognition unit, a barcode reader connected to the tester, or signaling messages sent from the mobile station under test, and
 storing the characteristic parameters to the mobile station under test dataset.

10. The method according to claim 8, wherein retrieving the characteristic parameters of the mobile station under test occurs via at least one of an image recognition unit, a barcode reader connected to the tester, or signaling messages sent from the mobile station under test, and
 wherein the method further comprises storing the characteristic parameters to the mobile station under test dataset.

11. The method according to claim 1, further comprising storing a test result of the mobile station under test correlated to the identification information of the type of the mobile station under test.

12. The method according to claim 1, further comprising storing settings and/or test configurations of the tester applied by a specific test operator in an operator database.

13. The method according to claim 12, further comprising:
 receiving identification information of a test operator via at least one of an input unit, an image recognition unit, or a barcode reader at the tester; and
 configuring the tester in accordance with the operator dataset.

14. A non-transitory digital storage medium with electronically readable control signals, which interact with a programmable computer and/or a digital signal processor, such that the control signals, when executed, cause the programmable computer and/or the digital signal processor to perform the method according to claim 1.

15. The method according to claim 1, further comprising establishing a mobile station under test dataset including a parameter set provided by a technical standard to be applied to the test program.

16. A test system for automatically configuring a tester to perform functionality tests between a mobile station under test and the tester, comprising:
   the tester, the tester configured to emulate a mobile communication system and interact with the mobile station under test;
   a device database storing characteristic parameters of the mobile station under test; and
   a test case database storing test cases applicable to the characteristic parameters of various different types of mobile stations under test,
   wherein the tester is configured:
      to receive identification information of the mobile station under test,
      to retrieve, based on the received identification information, the characteristic parameters of the mobile station under test from the device database,
      to select a subset of test cases applicable to the mobile station under test from the test case database,
      to offer the subset of test cases to an operator to generate a test program by applying one or more test cases of the selected subset,
      to evaluate a created log file of a performed test program,
      to adapt an applied configuration of the tester and/or the selected subset of test cases according to results of the evaluation of the created log file, and
         to compare the available software and/or hardware components and/or version of a tester to a software and/or hardware required to perform the test program and to detect and report missing software and/or hardware components.

17. The test system according to claim 16, wherein the tester is further configured:
   to retrieve at least one operating parameter of the tester according to the selected subset of test cases with the characteristic parameters of the mobile station under test from the test case database, and
   to configure the operating parameter accordingly.

18. The test system according to claim 16, wherein a log unit is connected to the tester, the log unit being configured to create the log file of the performed test program.

19. The test system according to claim 16, wherein a test operator specific setting unit is connected to the tester, the test operator specific setting unit being configured to store a test operator specific common setting and/or operator specific test programs of the tester.

20. The test system according to claim 16, wherein the device database is implemented on at least one of:
   an application server and is remotely accessible by the tester, or
   an external storage medium connected via an interface to the tester.

21. The test system to claim 16, wherein the tester is further configured to receive input via an input unit, the input unit including at least one of a Universal Serial Bus-interface, an image recognition unit, or a barcode reader, to input at least one of the identification information of the mobile station under test or an identification of the test operator.

* * * * *